United States Patent
Ban (10) Patent No.: US 9,604,363 B2
(45) Date of Patent: Mar. 28, 2017

(54) OBJECT PICKUP DEVICE AND METHOD FOR PICKING UP OBJECT

(71) Applicant: FANUC CORPORATION, Minamitsuru-gun, Yamanashi (JP)

(72) Inventor: Kazunori Ban, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 183 days.

(21) Appl. No.: 14/067,168

(22) Filed: Oct. 30, 2013

(65) Prior Publication Data
US 2014/0121836 A1    May 1, 2014

(30) Foreign Application Priority Data

Oct. 31, 2012    (JP) ................... 2012-240501

(51) Int. Cl.
  *B25J 9/16*    (2006.01)
  *B65G 47/90*   (2006.01)
  *B25J 9/00*    (2006.01)

(52) U.S. Cl.
  CPC .......... *B25J 9/1697* (2013.01); *B25J 9/0093* (2013.01); *B65G 47/905* (2013.01); *G05B 2219/39508* (2013.01); *G05B 2219/40053* (2013.01); *G05B 2219/40607* (2013.01)

(58) Field of Classification Search
  CPC ..... B25J 9/1697; B25J 19/021–19/023; B65G 47/905; B23P 19/007; G06T 7/004; G06T 7/0044; G06T 2207/30164; G05B 2219/40053; G05B 2219/40607; G05B 2219/39508
  See application file for complete search history.

(56) References Cited

U.S. PATENT DOCUMENTS

| 2004/0122552 A1 | 6/2004 | Ban et al. |
| 2004/0162639 A1* | 8/2004 | Watanabe et al. ............ 700/259 |
| 2010/0004778 A1* | 1/2010 | Arimatsu et al. ............ 700/214 |

FOREIGN PATENT DOCUMENTS

| DE | 102008052436 | 4/2010 |
| JP | 2004-188562 | 7/2004 |
| JP | 3805302 | 8/2004 |
| JP | 2004-249391 | 9/2004 |
| JP | 2011-183537 | 9/2011 |
| JP | 2012-101320 | 5/2012 |

* cited by examiner

*Primary Examiner* — Spencer Patton
(74) *Attorney, Agent, or Firm* — RatnerPrestia (57) ABSTRACT

A pickup device for picking up a target object from a plurality of objects randomly piled up in a container, and for placing the target object in a predetermined posture to a target location is provided. The device includes an approximate position obtaining part for obtaining information on an approximate position of the target object, based on information on a height distribution of the objects in the container, which is obtained by a first visual sensor. The device also includes a placement operation controlling part for controlling a robot so as to bring the target object into a predetermined position and posture relative to the target location, based on information on a position and posture of the target object relative to a robot, which is obtained by a second visual sensor.

13 Claims, 10 Drawing Sheets

OBJECT PICKUP DEVICE AND METHOD FOR PICKING UP OBJECT

BACKGROUND OF THE INVENTION

1. Field of the Invention

The present invention relates to a device and method for picking up an object by a robot from a plurality of objects randomly piled up in a container.

2. Description of the Related Art

In connection with an automated pickup process for picking up an object successively from a plurality of objects randomly piled up in a container, various approaches have been proposed. In recent years, practical approaches have been introduced, as processing capacity of a computer is enhanced and an image processing technology advances. For example, JP-A-2004-188562 discloses determining an object to be picked up based on measurement of an approximate height distribution of objects which are randomly piled up, prior to measurement of positions and postures of the objects.

There is a need for a practical pickup device and method for picking up an object, which allows a pickup process of the object to be automated.

SUMMARY OF THE INVENTION

According to a first aspect of the present disclosure, a pickup device for picking up by using a robot a target object from a plurality of objects randomly piled up in a container and for placing the target object in a predetermined posture at a target location, wherein the robot comprises a holding unit for releasably holding the target object, the pickup device comprising: a first visual sensor for obtaining information on a height distribution of the plurality of objects in the container; an approximate position obtaining part for obtaining information on an approximate position of the target object which is at a higher position than surrounding objects in the container, based on the information on a height distribution obtained by the first visual sensor; a pickup operation controlling part for controlling the robot so as to allow the holding unit to hold the target object, based on the information on an approximate position of the target object obtained by the approximate position obtaining part; a second visual sensor for obtaining information on a position and posture of the target object relative to the holding unit by measuring the target object when the target object is held by the holding unit; and a placement operation controlling part for controlling the robot so as to, bring the target object held by the holding unit into a predetermined position and posture relative to the target location, based on the position and posture of the target object relative to the holding unit obtained by the second visual sensor, is provided.

According to a second aspect of the present disclosure, in the pickup device according to the first aspect, the second visual sensor is a two dimensional camera.

According to a third aspect of the present disclosure, in the pickup device according to the first aspect, the second visual sensor is a three dimensional visual sensor.

According to a fourth aspect of the present disclosure, in the pickup device according to any of the first to third aspects, the device further comprises: a holding unit information storing part for storing a first information obtained by the second visual sensor, the first information being associated with the holding unit in a state where the holding unit does not hold the target object; and a relative position and posture calculating part for calculating the position and posture of target object relative to the holding unit, based on the first information and a second information obtained by the second visual sensor, the second information being associated with the holding unit in a state where the holding unit holds the target object.

According to a fifth aspect of the present disclosure, a method for picking up by using a robot a target object from a plurality of objects randomly piled up in a container and for placing the target object in a predetermined posture at a target location, wherein the robot comprises a holding unit for releasably holding the target object, the method comprising: obtaining information on a height distribution of the plurality of objects in the container by a first visual sensor; obtaining information on an approximate position of the target object which is at a higher position than surrounding objects in the container, based on the information on a height distribution obtained by the first visual sensor; controlling the robot so as to allow the holding unit to hold the target object, based on the information on an approximate position of the target object; obtaining information on a position and posture of the target object relative to the holding unit by a second visual sensor, by measuring the target object in a state where the target object is held by the holding unit; and controlling the robot so as to bring the target object held by the holding unit into a predetermined position and posture relative to the target location, based on the information on a position and posture of the target object relative to the holding unit obtained by the second visual sensor, is provided.

According to a sixth aspect of the present disclosure, in the method according to the fifth aspect, the second visual sensor is a two dimensional camera.

According to a seventh aspect of the present disclosure, in the method according to the fifth aspect, the second visual sensor is a three dimensional visual sensor.

According to an eighth aspect of the present disclosure, in the method according to any of the fifth to seventh aspects, the method further comprises: when the information on a position and posture of the target object relative to the holding unit is obtained, reading out a first information which has preliminarily been obtained by the second visual sensor and stored, the first information being associated with the holding unit in a state where the holding unit does not hold the target object; and calculating the position and posture of the target object relative to the holding unit, based on the first information and a second information obtained by the second visual sensor, the second information being associated with the target object in a state where the holding unit holds the target object.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described below with reference to the accompanying drawings. Illustrated constituent elements may be modified in size in relation to one another for better understanding of the invention. The same or corresponding constituent elements will be designated with the same referential numerals.

Figure 1:
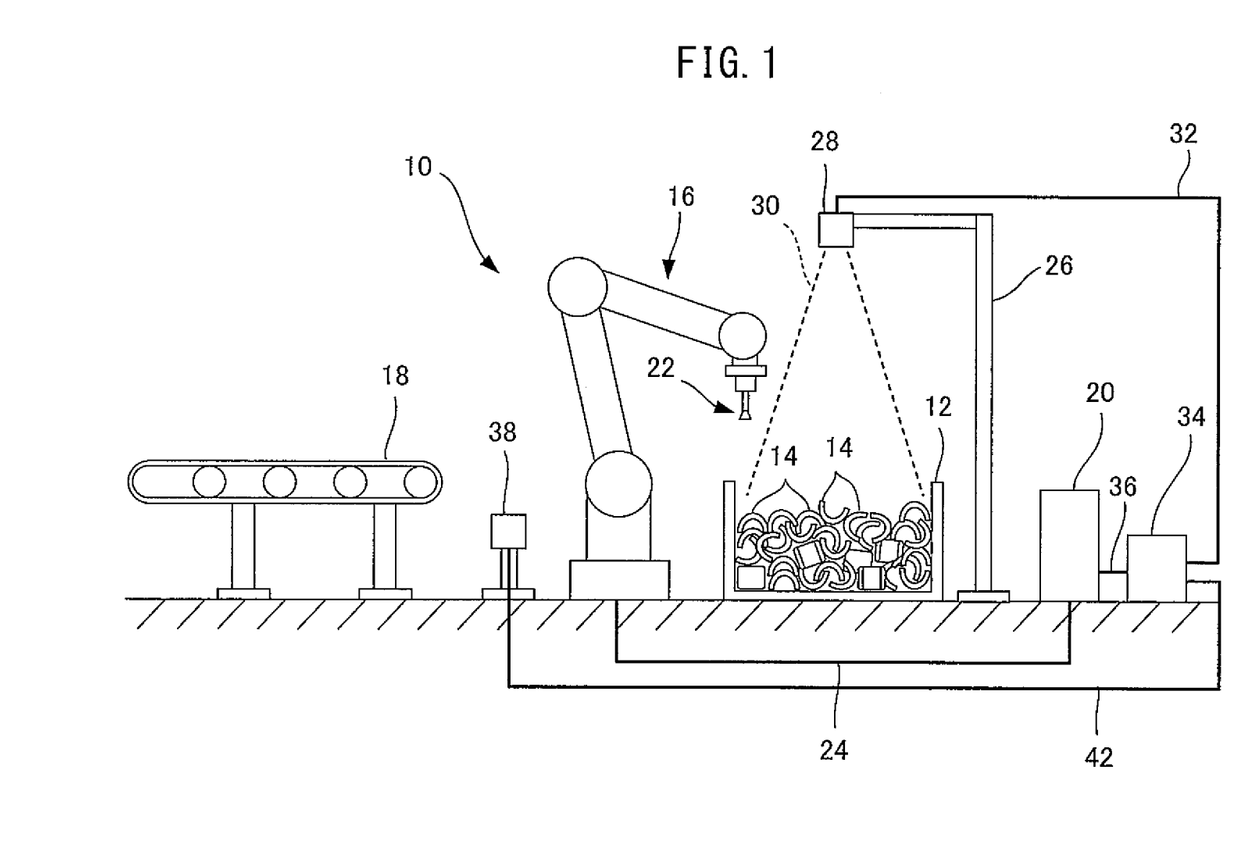
FIG. 1 is a side view schematically illustrating a robot system according to one embodiment of the present invention.
Figure 2:
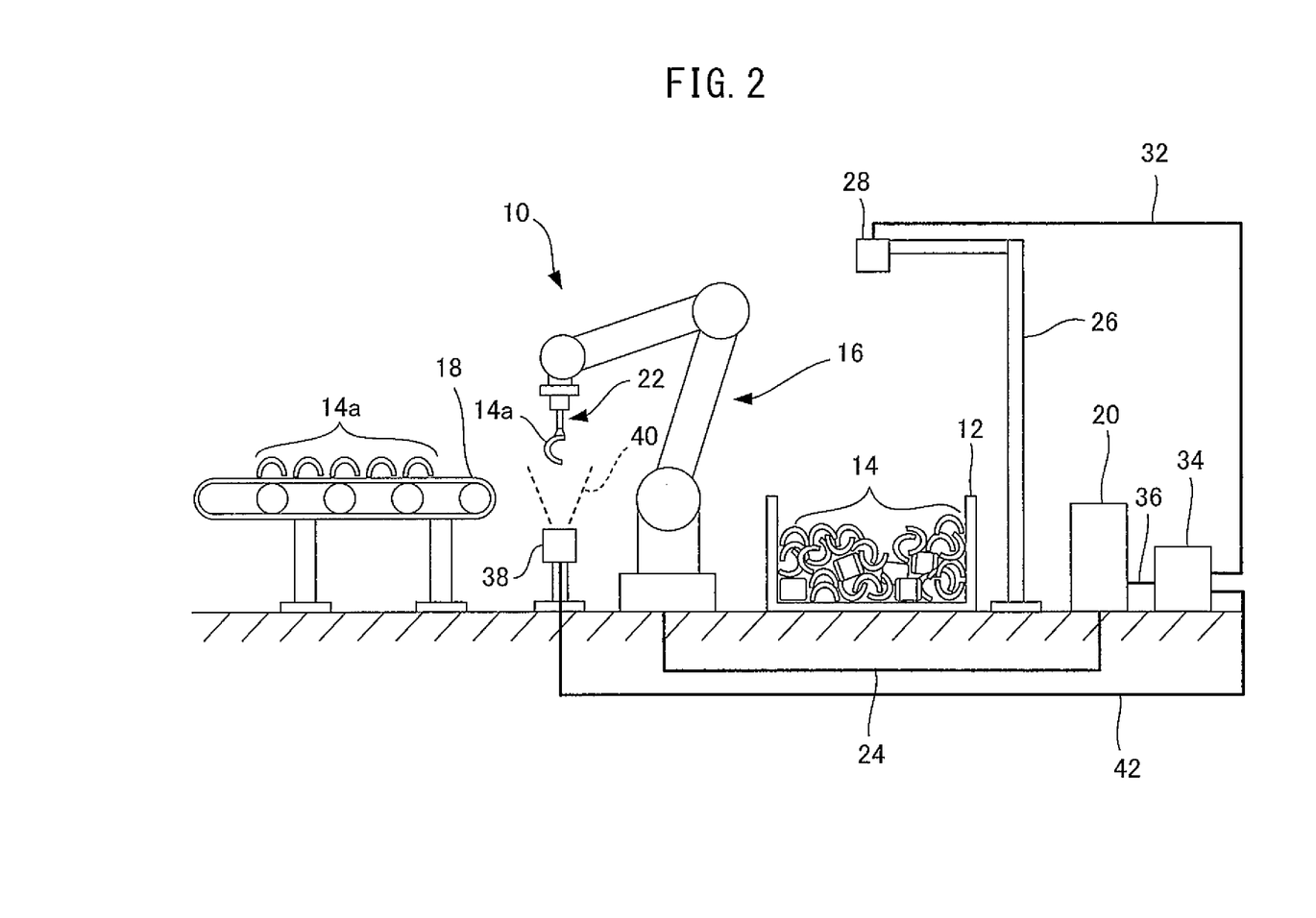
FIG. 2 is a side view schematically illustrating a robot system according to one embodiment of the present invention.
Figure 3:
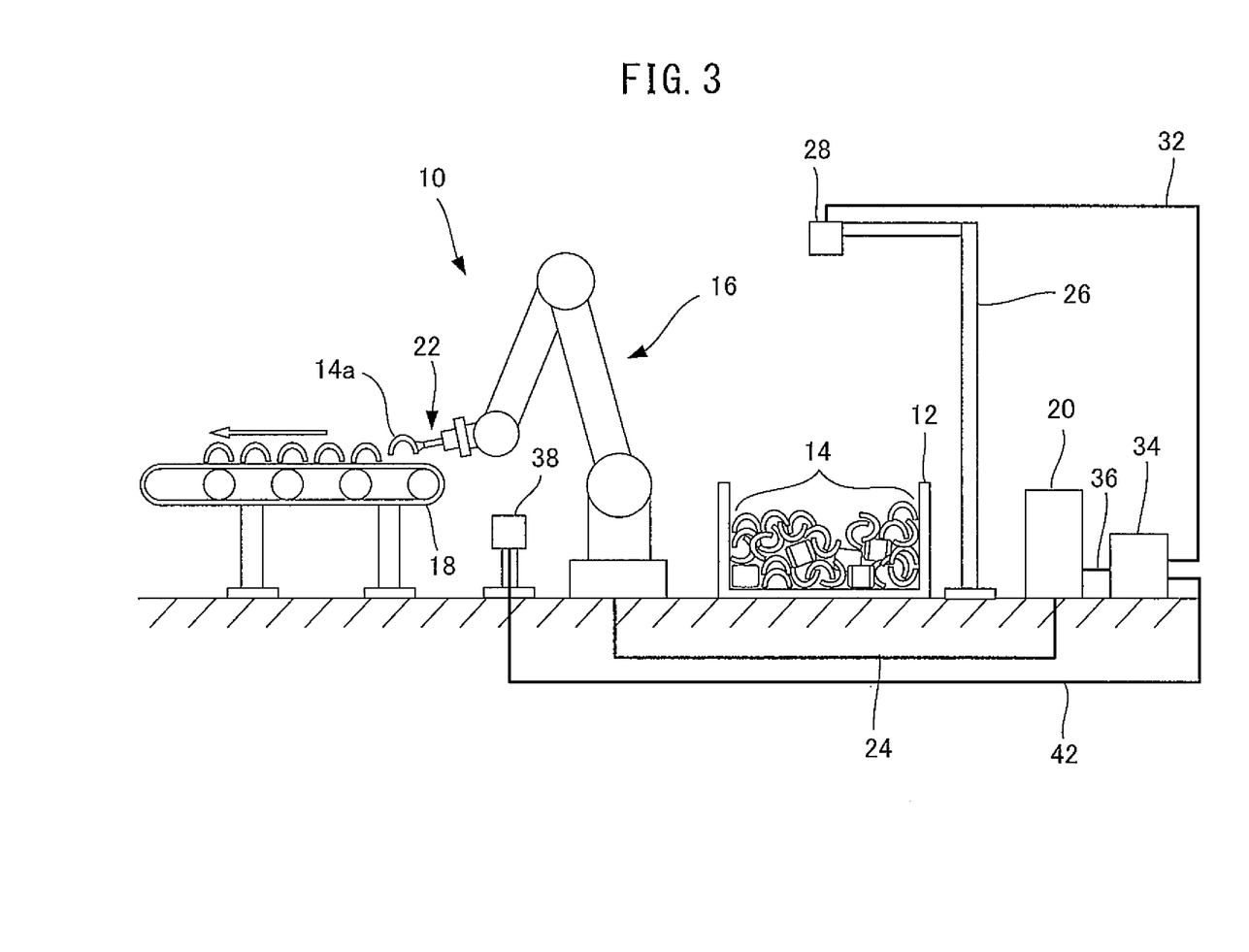
FIG. 3 is a side view schematically illustrating a robot system according to one embodiment of the present invention.

Referring to FIGS. 1 to 3, a configuration and functions of an exemplary pickup device according to a first embodiment of the present invention, i.e., a robot system 10, will be described. FIGS. 1 to 3 are side views schematically illustrating the robot system 10. The robot system 10 is used to pick up a target workpiece 14a from a plurality of workpieces 14 randomly piled up in a container 12 (see FIG. 2), and place the target workpiece 14a in a predetermined posture at a target location (see FIG. 3). The term "target workpiece 14a (target object)" used herein means a workpiece (object) selected as a subject of being picked up from the container 12 in a pickup process. This term is used for convenience in order to distinguish it from the rest of workpieces 14 which remain within the container 12.

The container 12 has a bottom wall and a circumferential wall extending substantially vertically upward from the circumference of the bottom wall to define a space for accommodating a plurality of workpieces 14. The workpiece 14 is an exemplary object to be picked up by the robot system 10, and, for example, a half-cylindrical member having half-circular arc shaped cross section in side view, as illustrated in the drawings. There is an opening in the upper portion of the container 12, for example, a circular or rectangular opening in plan view, which allows a robot 16 to gain access to the workpieces 14 in the container 12 from above.

The robot 16 is a known robot having multiple joint axes controlled by a robot controller 20 connected thereto via a line 24. The robot 16 is equipped with an end effector 22 which serves as means for releasably holding the workpiece 14. For example, the end effector 22 may be a suction-pad type gripper, as illustrated in the drawings, which can hold a target object 14a by suction force caused by negative pressure in the interior thereof. Alternatively, the end effector 22 may also be a magnetic gripper which cooperates with means for generating magnetic force such as an electromagnet, a hydraulic gripper utilizing fluid pressure, or a mechanical hand with multiple fingers (or claws) which open and close in response to an electromechanical means. Accordingly, the end effector 22 may have any known configuration, depending on the shape of the workpiece 14 to be picked up by the robot system 10, etc. In response to driving signals sent from the robot controller 20, the end effector 22 of the robot 16 is adapted to hold or release the target object 14a.

There is a first visual sensor 28 fixedly attached to a support stand 26 above the container 12. In FIG. 1, dashed lines 30 drawing downward from the first visual sensor 28 show a measurement range of the first visual sensor 28. Although it is not necessary in the present invention, the measurement range of the first visual sensor 28 covers the entire space of the container 12 for accommodating the workpieces 14, as illustrated. The first visual sensor 28 is connected to a sensor controller 34 via a line 32, and designed to transmit to, and receive from the sensor controller 34, signals related to the measurement process, such as a command for activating a measurement process and a result of the measurement.

The first visual sensor 28 is a three dimensional visual sensor designed to obtain information on a height distribution of the plurality of workpieces in the container 12, in response to a measurement start signal from the sensor controller 34. For example, the height distribution consists of a set of three dimensional points obtained in accordance with predetermined special resolution. The set of three dimensional points is, for example, a group of data related to three dimensional positions, which are represented as (X, Y, Z) in a working coordinate system, in reference to which the robot 16 is controlled. The first visual sensor 28 may be any type of three dimensional visual sensor, generally referred to as "range finder."

For example, the three dimensional visual sensor is equipped with a plurality of two dimensional cameras which can obtain two dimensional image data. Based on the two dimensional image data, the three dimensional visual sensor measures a distance from its sensor head to an object according to the concept of stereo vision. Alternatively, the first visual sensor 28 may also be a three dimensional visual sensor which is adapted to scan, with a slit laser beam, a surface extending perpendicularly to a direction of the laser projection, and receive reflective light of the laser beam by a camera mounted on the sensor head. The first visual sensor 28 may also be a three dimensional visual sensor of a Time-of-Flight type, which employs a plurality of infrared LEDs arranged to form a two dimensional array. In this case, a distance to the object (the workpiece 14 in this example) is measured based on a difference in time necessary for infrared light emitted from the infrared LEDs to return to the sensor head after reflected by the object.

The result of measurement by the first visual sensor 28 is transmitted to the sensor controller 34 via a line 32. The sensor controller 34 may also include an image processing apparatus (not shown) for processing an image information from the first visual sensor 28. The image processing apparatus may be incorporated in the sensor controller 34, or may be provided independently of the sensor controller 34. To the sensor controller 34, a second visual sensor 38 is further connected via a line 42. The sensor controller 34 and the image processing apparatus cooperating with the sensor controller 34 are not limited to any particular type, but may be various known types of controller. The information on the height distribution of the workpieces 14 obtained by the first visual sensor 28 is transmitted to the robot controller 20 connected to the sensor controller 34 via a line 36, so as to be used for the purpose of controlling the robot 16, as further described below. In the illustrated embodiment, the robot controller 20 and the sensor controller 34 are separate apparatuses from each other, but the sensor controller 34 may be incorporated in the robot controller 20.

The second visual sensor 38 is situated distant from the container 12, as illustrated. Dashes lines 40 in FIG. 2 depicted upward from the second visual sensor 38 show a measurement range of the second visual sensor 38. The second visual sensor 38 measures a target workpiece 14a held by the end effector 22 of the robot 16 and obtain information on a position and posture of the target workpiece 14a relative to the end effector 22. As shown in FIG. 2, when the measurement of the target workpiece 14a is carried out by the second visual sensor 38, a position and posture of the robot 16 are controlled so as to ensure that the workpiece 14a is within the measurement range of the second visual sensor 38. The position and posture of the end effector 22 of the robot 16 for carrying out the measurement by the second visual sensor 38 is predefined information, or alternatively, information obtained in the robot controller 20 at a moment when the measurement is carried out. The information on a position and posture obtained by the second visual sensor 38 is then subject to an appropriate coordinate transformation, whereby a position and posture of the target workpiece 14a relative to the end effector 22 of the robot 16 can be obtained. For example, JP-B-4174342 discloses a process for calculating a relative position and posture of the target workpiece 14a, which involves a coordinate transformation. The second visual sensor 38 may be provided in a position where it is possible to measure the target workpiece 14a independently of the workpieces 14 within the container 12, but not limited to the position illustrated in the drawings.

A conveyor 18 is configured to successively convey the target workpiece 14a picked out of the container 12 for any subsequent process. The target workpiece 14a is placed on the conveyor 18 so as to have a predetermined posture relative to the conveyor 18 as shown in FIG. 3 (for example, such that the convex portion of the target 14a faces upward).

Figure 10:
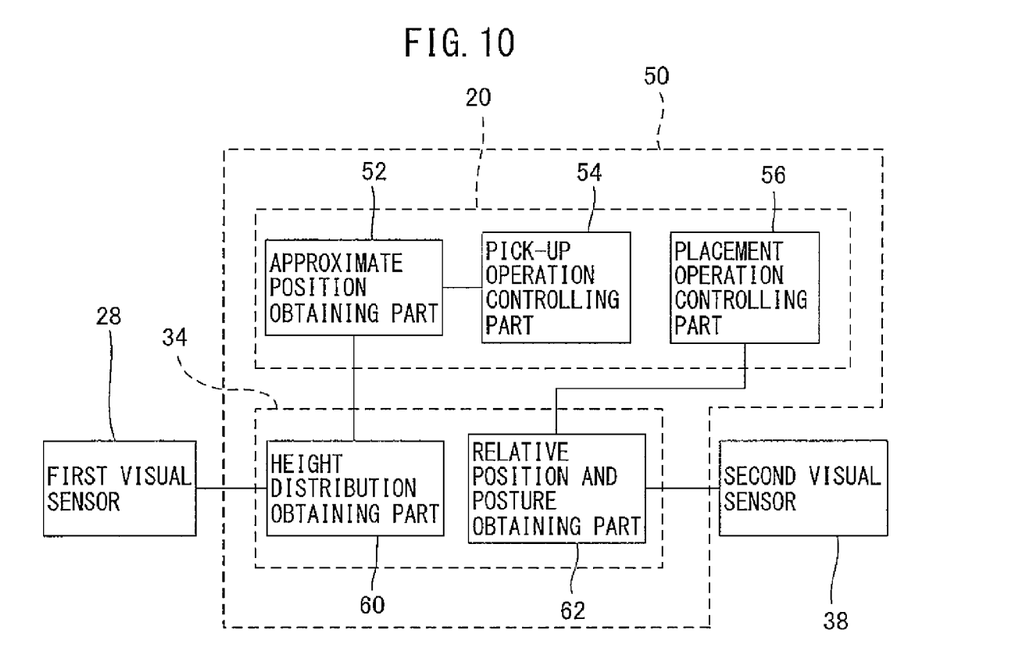
FIG. 10 shows a functional block diagram of a processing part of the robot system.

FIG. 10 shows a functional block diagram of a processing part 50 of the robot system 10 to explain functions of the robot controller 20 and the sensor controller 34 in the robot system 10. As illustrated, the robot controller 20 includes an approximate position obtaining part 52, a pick-up operation controlling part 54, and a placement operation controlling part 56. The sensor controller 34 includes a height distribution obtaining part 60, and a relative position and posture obtaining part 62. The height distribution obtaining part 60 functions to obtain a height distribution of the workpieces 14 in the container 12, based on the result of measurement by the first visual sensor 28. The relative position and posture obtaining part 62 functions to obtain a position and posture of a target workpiece 14a relative to the end effector 22 in a state where the target workpiece 14a is held by the end effector 22, based on the result of measurement by the second visual sensor 38.

Figure 4:
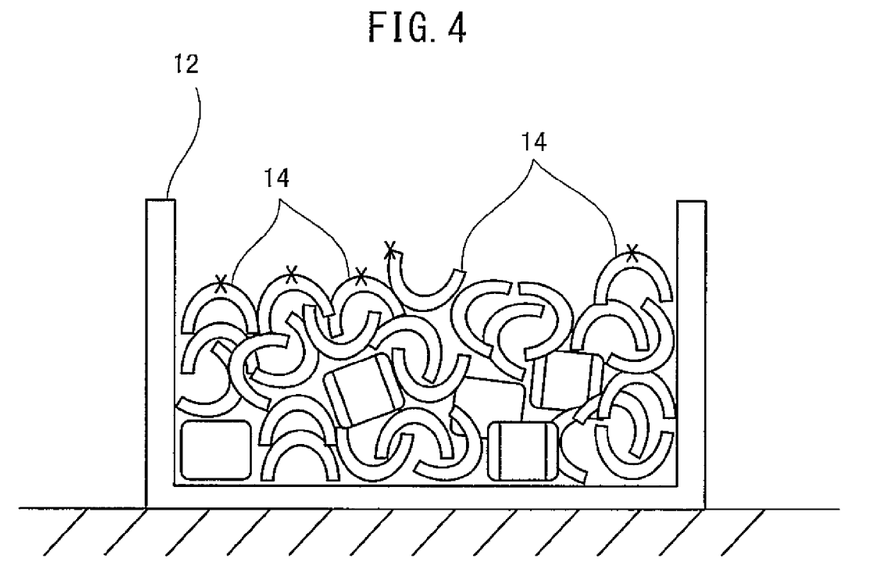
FIG. 4 is an enlarged view illustrating a container in which workpieces are accommodated.

The approximate position obtaining part 52 obtains information on an approximate position of a target workpiece 14a positioned higher than the surrounding workpieces 14 within the container 12, based on the height distribution of the workpieces 14 obtained by the height distribution obtaining part 60. FIG. 4 shows an enlarge view illustrating the container 12 in which a number of workpieces 14 are accommodated. In the robot system 10, information on a three dimensional position of a portion of the target workpiece 14a in a higher position is determined as an "approximate position" of the target workpiece 14a. In FIG. 4, the character "X" appended to the workpiece 14 represents an approximate position of the target workpiece 14a.

Figure 5:
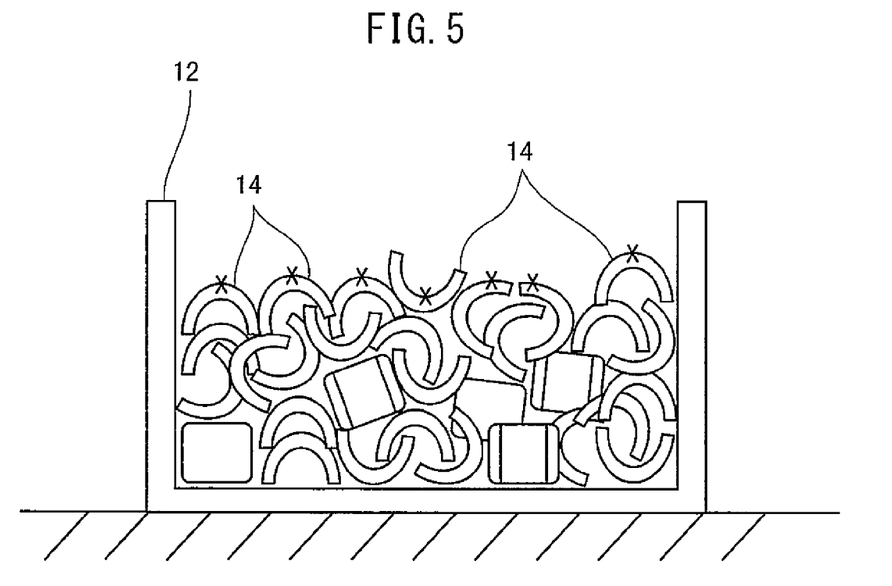
FIG. 5 is an enlarged view illustrating a container in which workpieces are accommodated.

FIG. 5 is an enlarged view similar to FIG. 4. In an embodiment shown in FIG. 5, an approximate position of the target workpiece 14a is determined in accordance with a predetermined point (e.g., the center of gravity) on a flat surface portion of a substantially flat surface extending over a predetermined cross-section area S, instead of a local portion positioned in a higher position. For example, the flat surface portion is chosen when it has cross-section area S which satisfies the relation: S1<S<S2, where S1 is a lower limit value, and S2 is an upper limit value. In FIG. 5, the character "X" depicted on the workpiece 14 represents an approximate position of the target workpiece 14a in the illustrated example.

The exemplary process for determining an approximate position of the target workpiece 14a has been described with reference to FIGS. 4 and 5, but the present invention is not limited thereto. In other words, an approximate position of the target workpiece 14a obtained by the approximate position obtaining part 52 can be in other forms, as long as based on that, the position which allows the target workpiece 14a to be held by the end effector 22 can be identified. Accordingly, other processes may also be used to determine an approximate position of the target workpiece 14a.

The pick-up operation controlling part 54 functions to generate a drive signal, based on the approximate position of the target workpiece 14a obtained by the approximate position obtaining part 52, in order to control the robot 16 and hold the target workpiece 14a by the end effector 22. In the case where the approximate position of the target piece 14a described in relation to FIGS. 4 and 5 is used, the robot 16 is controlled with respect to its position and posture so as to position the end effector 22 in a position shown by "X."

The placement operation controlling part 56 functions to generate a control signal, based on the relative position and posture of the target workpiece 14a obtained by the relative position and posture obtaining part 62, in order to control the robot 16 and place the target workpiece 14a held by the end effector 22 at a target site on the conveyor 18. In addition, the robot 16 is controlled so that the target workpiece 14a has a predetermined posture relative to the target site, or in other words, so that the target workpiece 14a is placed in a predetermined posture on the conveyor 18. FIG. 3 shows an exemplary position and posture of the robot 16 when the target workpiece 14a is placed on the conveyor 18.

Figure 6A:
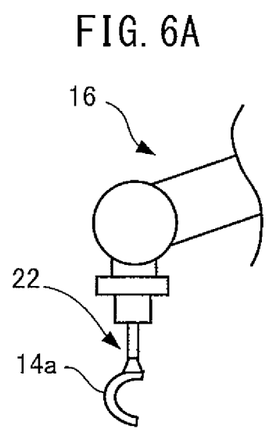
FIGS. 6A to 6C are partially enlarged views illustrating exemplary states where a workpiece held by an end effector.
Figure 6B:
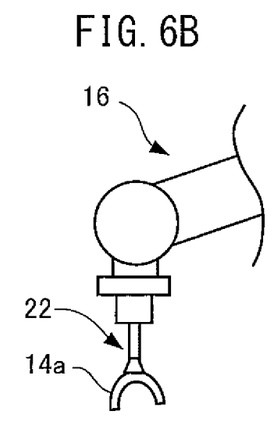

FIGS. 6A to 6C and 7A to 7C are partially enlarged views illustrating examples of target workpieces 14a being held by the end effector 22. FIG. 6A shows the target work piece 14a being held on a portion near one end of a circular arc portion thereof. In this case, by rotating the target workpiece 14a by about 90 degrees in a clockwise direction to change a posture of the robot 16, a predetermined posture of the target workpiece 14a relative to the conveyor 18 as shown in FIG. 3 can be obtained. FIG. 6B shows a target workpiece 14a with its convex portion being held by the end effector 22 and facing substantially vertically upward. In other words, the target workpiece 14a already has a predetermined posture relative to the conveyor 18. Thus, the target workpiece 14a in this case can be moved to the conveyor 18 while maintaining the posture of the target workpiece 14a as is.

Figure 6C:
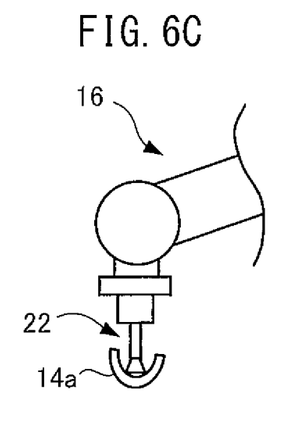
Figure 7A:
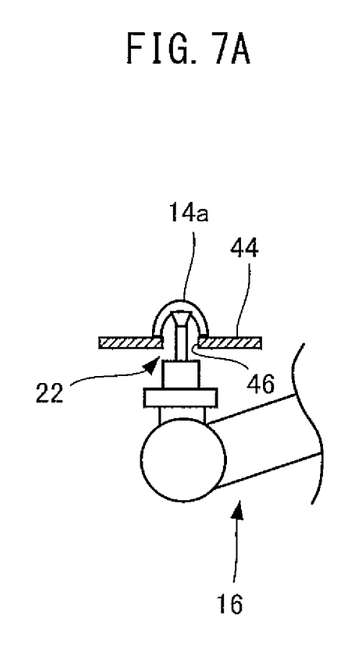
FIGS. 7A to 7C are partially enlarged views illustrating an exemplary workpiece being held by an end effector.
Figure 7B:
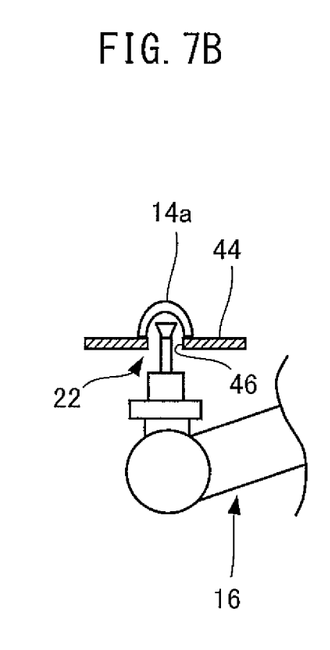
Figure 7C:
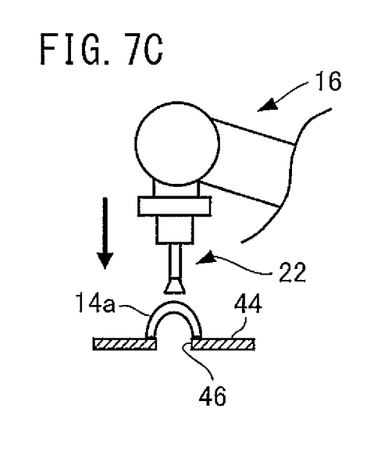

FIG. 6C shows a target workpiece 14a held by the end effector 22 in a state where the target workpiece 14a is rotated by 180 degrees from a predetermined posture relative to the conveyor 18. In this case, it is difficult to place the target workpiece 14a in an appropriate posture on the conveyor 18 by simply changing the posture of the robot 16. Therefore, for example, a table 44 formed with an opening 46 to which the end effector 22 can be inserted as shown in FIG. 7A is used. As can be seen in FIGS. 7A to 7C, the target workpiece 14a is first placed on the table 44, and the target workpiece 14a is then held again from the opposite side thereof.

Figure 8A:
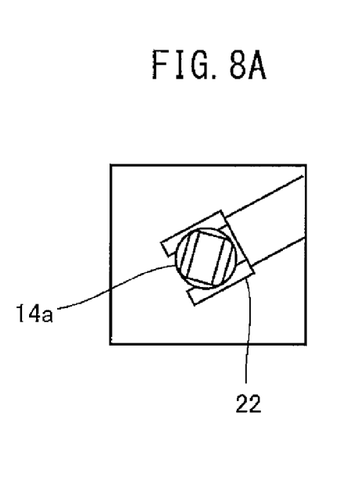
FIGS. 8A to 8C show exemplary images obtained by a second visual sensor.
Figure 8B:
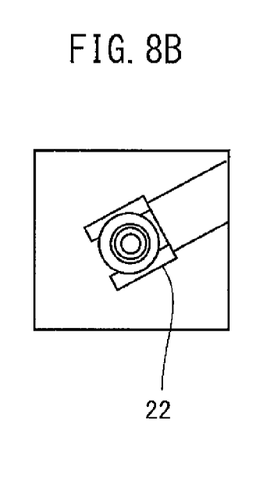
Figure 8C:
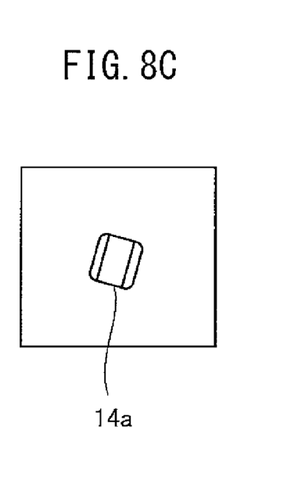
Figure 11:
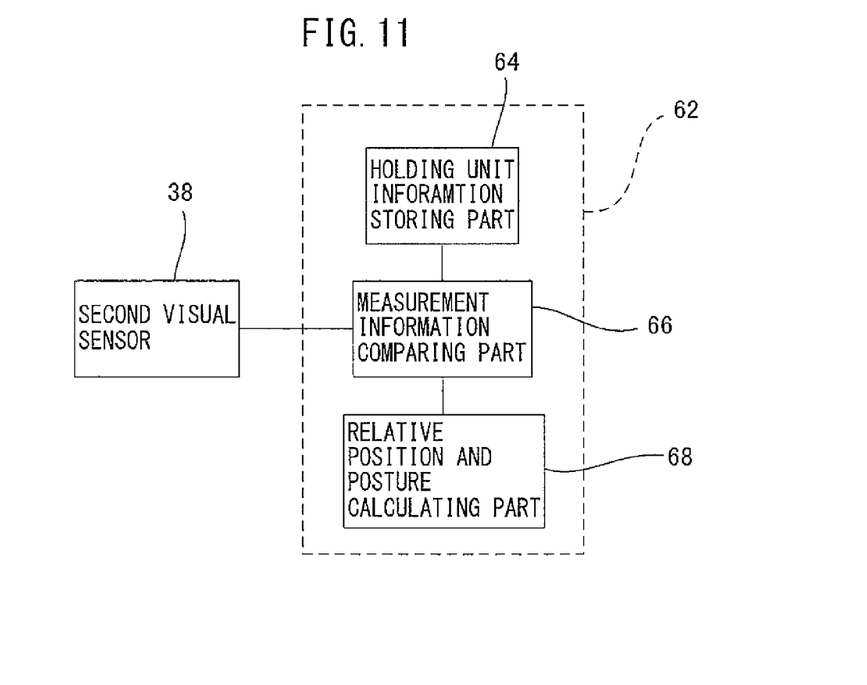
FIG. 11 shows a functional block diagram of a relative position and posture obtaining part.

Referring to FIGS. 8A to 8C and FIG. 11, an exemplary process for obtaining a relative position and posture of the target workpiece 14a by the relative position and posture obtaining part 62 will be described. FIGS. 8A to 8C show exemplary images obtained by the second visual sensor 38. FIG. 11 shows a functional block diagram of a relative position and posture obtaining part 62 in one embodiment. As shown in FIG. 11, the relative position and posture obtaining part 62 further includes a holding unit information storing part 64, a measurement information comparing part 66 and a relative position and posture calculating part 68.

The holding unit information storing part 64 functions to store measurement information, e.g., an image of the end effector 22 (holding unit) in a state where the end effector 22 does not hold the target workpiece 14a. FIG. 8B shows an image of the end effector 22 when the end effector does not hold the target workpiece 14a. The holding unit information storing part 64 is used to store image information, for example, as shown in FIG. 8B. In contrast, FIG. 8A shows an image of the end effector 22 which is holding the target workpiece 14a. The image of FIG. 8A is obtained by the second visual sensor 38, for example, in a state shown in FIG. 2. Therefore, FIG. 8A captures both the end effector 22 and the target workpiece 14a. In the states shown in FIGS. 8A and 8B, the end effector 22 is positioned so as to be in the same position and posture as each other.

The measurement information comparing part 66 functions to compare the image of FIG. 8A and the image of FIG. 8B with each other, and remove an image which commonly exists in the two images from the image of FIG. 8A, in order to obtain an image in which only the target workpiece 14a appears as shown in FIG. 8C. The relative position and posture calculating part 68 functions to calculate a position and posture of the target workpiece 14a relative to the end effector 22, based on the image of the target workpiece 14a obtained by the measurement information comparing part 66. In this way, the relative position and posture obtaining part 62 obtains the relative position and posture of the target workpiece 14a, based on the measurement result of the second visual sensor 38.

Figure 12:
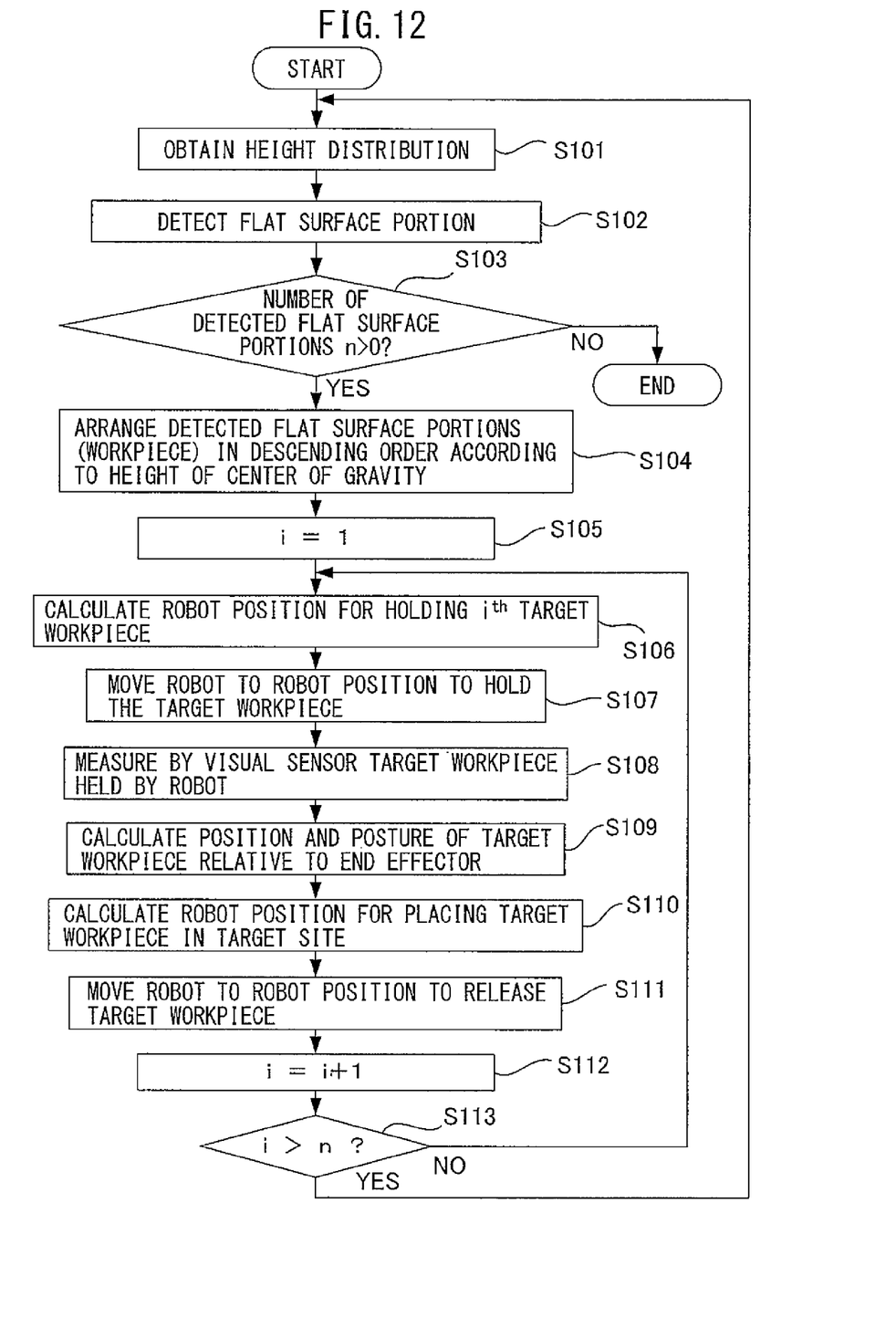
FIG. 12 is a flow chart showing a process for picking up a target object by the robot system.

Next, referring to FIG. 12, a process for picking up a target workpiece 14a by the robot system 10 according to the above-described embodiment. FIG. 12 is a flow chart showing a pickup process of the target workpiece 14a by the robot system 10.

In response to a starting command received by the robot controller 20, a measurement starting signal is output to the first visual sensor 28 through the sensor controller 34. For example, the starting command may be generated by a user operating an operating part (not shown). In response to the measurement starting signal from the sensor controller 34, the first visual sensor 28 obtains information on a height distribution of the workpieces 14 which is determined by a distance between the sensor head and the workpiece 14. The information on a height distribution of the workpieces 14 is input to the height distribution obtaining part 60 of the sensor controller 34, and the height distribution of the workpieces 14 within the container 12 is calculated (step S101). During this process, the robot 16 and its end effector 22 have been retracted in a position distant from the container 12 so as not to be caught within a measurement range delimited by the dashed lines 30, thereby preventing interference with the measurement by the first visual sensor 28.

It should be noted that a calibration process for associating data measured by the first visual sensor 28 with a working coordinate of the robot 16 has been preliminarily completed.

Based on the height distribution obtained at step S101, a flat surface portion(s) is detected by the sensor controller 34 (step S102). In addition, the number of detected flat surface portions n is counted. The flat surface portion is a part of the workpiece 14 extending substantially horizontally over predetermined area S, as described above in relation to FIG. 5. If at least one flat surface portion is detected, the process proceeds to next step S104. If no flat surface portion is detected, it is assumed that there is no target workpiece 14a which should be picked up, and the pickup process is terminated (step S103). If at least one flat surface portion is detected at step S103, an order of the target workpieces 14a are determined in association with the flat surface portions, so as to arrange in a descending order of height of certain positions (e.g., center of gravity) of the detected flat portions of the workpieces 14 (step S104).

At step S105, in order to successively pick up the target workpiece 14a from the container 12, "i" is substituted for "i," which represents the "$i^{th}$" flat surface portion. A position and posture of the robot 16 which allows the end effector 22 of the robot 16 to hold the "$i^{th}$" target workpiece is then calculated (step S106). The position and posture of the robot 16 for holding the target workpiece 14a is determined based on an approximate position of the target workpiece 14a obtained by the approximate position obtaining part 52. The robot 16 is then moved according to a control signal output from the pick-up operation controlling part 54 of the robot controller 20, and positioned at a robot position calculated at step S106. After the robot 16 reaches the predetermined position, the end effector 22 is driven to hold the target workpiece 14a (step S107).

Once the target workpiece 14a is held by the end effector 22, the robot 16 is moved to take the target workpiece 14a out of the container 12. As shown in FIG. 2, the robot 16 is moved to a position where the second visual sensor 38 can measure the target workpiece 14a. Then, the end effector with the target workpiece 14a held thereby is measured by the second visual sensor 38 (step S108). It should be noted that a calibration process for associating data measured by the second visual sensor 38 with a working coordinate of the robot 16 has been preliminarily completed.

Subsequently, the relative position and posture obtaining part 62 is activated to calculate a position and posture of the target workpiece 14a relative to the end effector 22 (step S109). In order to calculate the relative position and posture of the target workpiece 14a, the holding unit information storing part 64, the measurement information comparing part 66 and the relative position and posture calculating part 68, which are described above in relation to FIG. 11, are activated. Based on the relative position and posture of the target workpiece 14a, a position and posture of the robot 16 which allows the target workpiece to be placed in a predetermined posture and at a predetermined position are calculated (step S110). Then, the placement operation controlling part 56 is activated to move the robot 16 to a given position calculated at step S110. After the robot 16 is moved to the above position, the end effector 22 is released to place the target workpiece 14a on the conveyor 18 (step S111).

As a result of the above steps S106 to S111, one target workpiece 14a is picked up, taken out of the container 12 and placed at a target site. In order to select a target workpiece 14a to be picked up next, "i" is substituted for "i+1" (step S112). Then, it is judged as to whether or not the value of "i" exceeds the number of flat surface portions n detected at step S102 (step S113). If "i" is equal to or less than "n," it means that the number of the target workpieces 14a still existent within the container is n−(i−1), while the number of target workpieces 14a with the flat surface portions detected at step S102 is n. Then, the process returns to step S106 to continue a pickup process for the remaining target workpieces 14a. In this way, the processes at steps S106 to S111 are repeated until a pickup process for all of the target workpieces 14a with the flat surface portions detected at step S102 is completed.

On the other hand, if it is determined that "i" is greater than "n," or in other words, it is determined that all of the target workpieces 14a with the flat surface portions detected at step S102 have already been taken out, the process returns to step S101 to carry out a process for obtaining a height distribution of the workpieces 14 again.

According to the above-described embodiment, in the state where the target workpiece 14a is held by the robot 16, a position and posture of the target workpiece 14a relative to the end effector 22 of the robot 16 are measured by the second visual sensor 38. Therefore, there is no need to accurately measure a position and posture of the target workpiece 14a during a measurement process by the first visual sensor 28, which is carried out prior to the target workpiece 14a being held. In other words, it is only required to determine an approximate position of the target workpiece 14a to the extent which the target workpiece 14a can be held by the end effector 22. In this way, a measurement process for the workpieces 14 by the first visual sensor 28 can be completed for a shorter time period. In addition, accurate measurement of a three dimensional position and posture is carried out only for one target workpiece 14a which is being held by the robot 16. In this case, there is no risk of failure to recognize some workpieces 14 behind other workpieces 14, and therefore, the measurement process can be done with high precision, as compared to the case where a number of workpieces 14 are subjected to the three dimensional measurement at the same time. As a result, accuracy of a process for placing the target workpiece 14a at a predetermined site can be improved. Furthermore, since there is no need to process a large amount of three dimensional data, the time required for calculation is shortened and the productivity can be improved. Accordingly, a device and process for picking up workpieces 14 according to the present embodiment are more practical than the existing technology.

In order to accurately measure positions and postures of a number of objects randomly piled up in the container, a sophisticated technology and a calculator with increased performance are usually required. However, according to the present embodiment, they are not necessary. When a target object is held by a robot, the robot is generally designed to hold a predetermined portion of the target object. Thus, in order to do so, it is necessary to accurately measure a position and posture of the target objects. In contrast, in the present embodiment, as shown in FIGS. 6A to 6C, a relationship between the target workpiece 14a being held by the robot 16 and the end effector 22 of the robot 16 is not particularly limited. Therefore, high accuracy in measuring a plurality of workpieces 14a within the container 12 is not necessarily required.

In general, a detection model corresponding to a shape of an object is pre-set in a visual sensor. For this purpose, it is necessary to slightly adjust various settings when detection models are modified for the respective objects to be picked up. In contrast, according to the present embodiment where an approximate position of the target object is determined based on a height distribution of the objects, an impact due to differences in shapes of the objects on the measurement precision is relatively small, and therefore the present embodiment can be applied to various objects without additional adjustment.

Figure 9A:
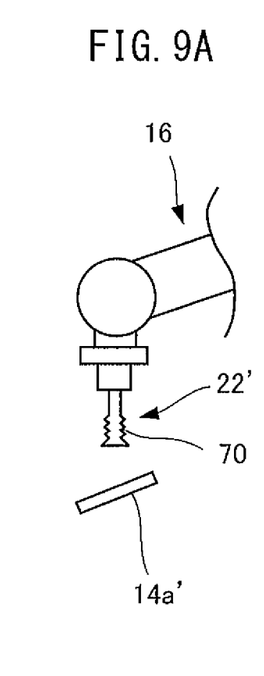
FIGS. 9A to 9C show a process in which a target workpiece is held by an end effector in another embodiment.
Figure 9B:
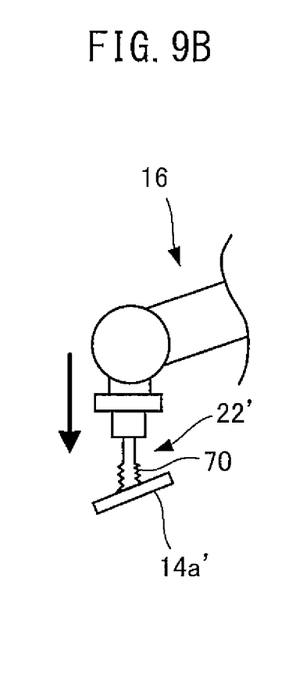
Figure 9C:
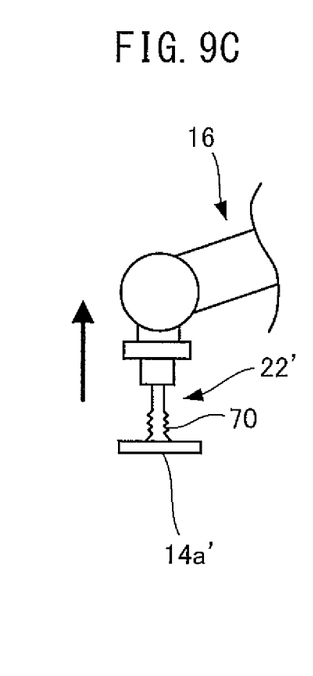

Although the exemplary embodiment in which a three dimensional visual sensor is used as the second visual sensor 38 has been described, the present invention is not limited to such a particular configuration. In an alternative embodiment, the second visual sensor 38 may be a two dimensional camera. In this embodiment, for example, a target workpiece 14a' substantially has a flat plate shape as shown in FIG. 9A. An end effector 22' in this embodiment is a gripper in the form of a suction pad with bellows 70. FIGS. 9A to 9c show processes of holding the target workpiece 14a' by the end effector 22'. As shown in FIG. 9A, the target workpieces 14a' are randomly piled up in the container 12 (not shown) as in the above-described embodiment, so that the target workpieces 14a' have various positions and postures relative to the end effector 22'. However, the end effector 22' provided with the bellows 70 as shown in FIG. 9B can change its shape in association with the posture of the target workpiece 14a'. As shown in FIG. 9C, when the target workpiece 14a' is pulled up, a surface of the target workpiece 14a' is oriented perpendicularly to the end effector 22'. This applies to any target workpiece 14a' in the container 12, irrespective of its posture.

Therefore, in the case where the end effector 22' and the target workpiece 14a' are employed as describe above, if a position and posture of a flat surface (e.g., horizontal surface) extending perpendicularly to an axis of the end effector 22' in relation to the end effector 22' are determined, a position and posture of the target workpiece 14a' relative to the end effector 22' can be determined as well. Accordingly, in such an embodiment, the second visual sensor 38 does not have to be a three dimensional visual sensor, but can be a two dimensional visual sensor such as a two dimensional camera.

EFFECT OF THE INVENTION

According to the pickup device and method for picking up a target object in the present invention, a position and posture of the target object relative to the holding unit of the robot in a state where the target object is held by the robot are measured by the second visual sensor. This eliminates a need to precisely measure a position and posture of the target object before the target object is held by the robot. Accurate three dimensional measurement is only carried out for the target object being held by the robot. This facilitates the measuring process, as compared to the case where three dimensional measurements are performed for a large number of target objects at the same time, so that the measurement can be precise. As a result, accuracy of a process for placing the target object at a target position can be improved. Further, since there is no need to process a large amount of three dimensional data, it requires less time to complete the calculation, resulting in increased efficiency.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A pickup device configured to pick up by using a robot a target object from a plurality of objects randomly piled up in a container and configured to place the target object in a predetermined posture at a target location, wherein the robot comprises a holding unit configured to hold the target object to take the target object out of the container, the pickup device comprising:
- a first visual sensor configured to compute a height distribution of a visible subset of the plurality of objects in the container visible to the first visual sensor, the height distribution including the calculated heights for each of the objects in the visible subset;
- an approximate position obtaining part configured to obtain information on an approximate position of the target object which is at a higher position than surrounding objects in the visible subset, based on the information on a height distribution obtained by the first visual sensor and exclusive of a posture of the target object;
- a pickup operation controlling part configured to control the robot so as to allow the holding unit to hold the target object, based on the information on an approximate position of the target object obtained by the approximate position obtaining part and exclusive of the posture of the target object;
- a second visual sensor configured to obtain information on a position, and the posture of the target object relative to the holding unit by measuring the target object when the target object is held by the holding unit; and
- a placement operation controlling part configured to control the robot so as to bring the target object held by the holding unit into a predetermined position and the predetermined posture relative to the target location, based on the position and the posture of the target object relative to the holding unit obtained by the second visual sensor.

2. The pickup device according to claim 1, wherein the second visual sensor is a two dimensional camera.

3. The pickup device according to claim 1, wherein the second visual sensor is a three dimensional visual sensor.

4. The pickup device according to claim 1, further comprising:
- a holding unit information storing part configured to store a first information obtained by the second visual sensor, the first information being associated with the holding unit in a state where the holding unit does not hold the target object; and
- a relative position and posture calculating part configured to calculate the position and posture of the target object relative to the holding unit, based on the first information and a second information obtained by the second visual sensor, the second information being associated with the holding unit in a state where the holding unit holds the target object.

5. The pickup device according to claim 1, wherein the approximate position obtaining part is configured such that information on a three dimensional position of a portion of the target workpiece which is, situated at a locally, higher position is determined as the approximate position of the target workpiece, based on the height distribution.

6. The pickup device according to claim 1, wherein the approximate position obtaining part is configured such that a position of a flat surface portion of the target workpiece extending, over a predetermined cross-section area is determined as the approximate position of the target workpiece.

7. The pickup device according to claim 1, wherein the height distribution includes a set of three dimensional points on the plurality of objects and three dimensional positions of the three dimensional points.

8. A method configured to pick up by using a robot a target object from a plurality of objects randomly piled up in a container and configured to place the target object in a predetermined posture at a target location, wherein the robot comprises a holding unit configured to hold the target object to take the target object out of the container, the method comprising:
- computing a height distribution of a visual subset of the plurality of objects in the container visible to a first visual sensor, the height distribution including the calculated heights for each of the objects in the visible subset;
- obtaining information on an approximate position of the target object which is at a higher position than surrounding objects in the visible subset, based on the information on a height distribution obtained by the first visual sensor and exclusive of a posture of the target object;
- controlling the robot so as to allow the holding unit to hold the target object, based on the information on an approximate position of the target object and exclusive of the posture of the target object;
- obtaining information on a position and the posture of the target object relative to the holding unit by a second visual sensor, by measuring the target object in a state where the target object is held by the holding unit; and
- controlling the robot so as to bring the target object held by the holding unit into a predetermined position and the predetermined posture relative to the target location, based on the information on a position and the posture of the target object relative to the holding unit obtained by the second visual sensor.

9. The method according to claim 8, wherein the second visual sensor is a two dimensional camera.

10. The method according to claim 8, wherein the second visual sensor is a three dimensional visual sensor.

11. The method according to claim 8, further comprising:
- when the information on a position and posture of the target object relative to the holding unit is obtained,
- reading out a first information which has preliminarily been obtained by the second visual sensor and stored, the first information being associated with the holding unit in a state where the holding unit does not hold the target object; and
- calculating the position and posture of the target object relative to the holding unit, based on the first information and a second information obtained by the second visual sensor, the second information being associated with the target object in a state where the holding unit holds the target object.

12. The method according to claim 8, further including:
- determining information on a three dimensional position of a portion of the target workpiece which is situated at a locally higher position as the approximate position of the target workpiece, based on the height distribution.

13. The method according to claim 8, further including:
- determining a position of a flat surface portion of the target workpiece extending over a predetermined cross-section area as the approximate position of the target workpiece.

* * * * *